D. RONCONI.
WHEEL TIRE.
APPLICATION FILED FEB. 1, 1911.

1,008,284.

Patented Nov. 7, 1911.
2 SHEETS—SHEET 1.

Witnesses
Frank B. Wooden,
E. Walton Brewington.

Inventor
Domenico Ronconi,
By Henry J. Brewington,
Attorney

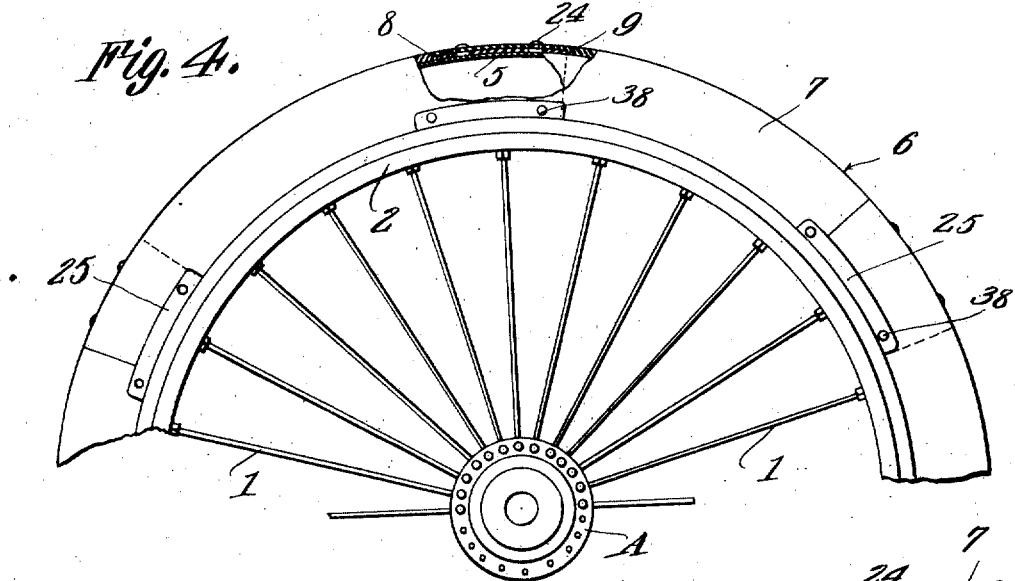
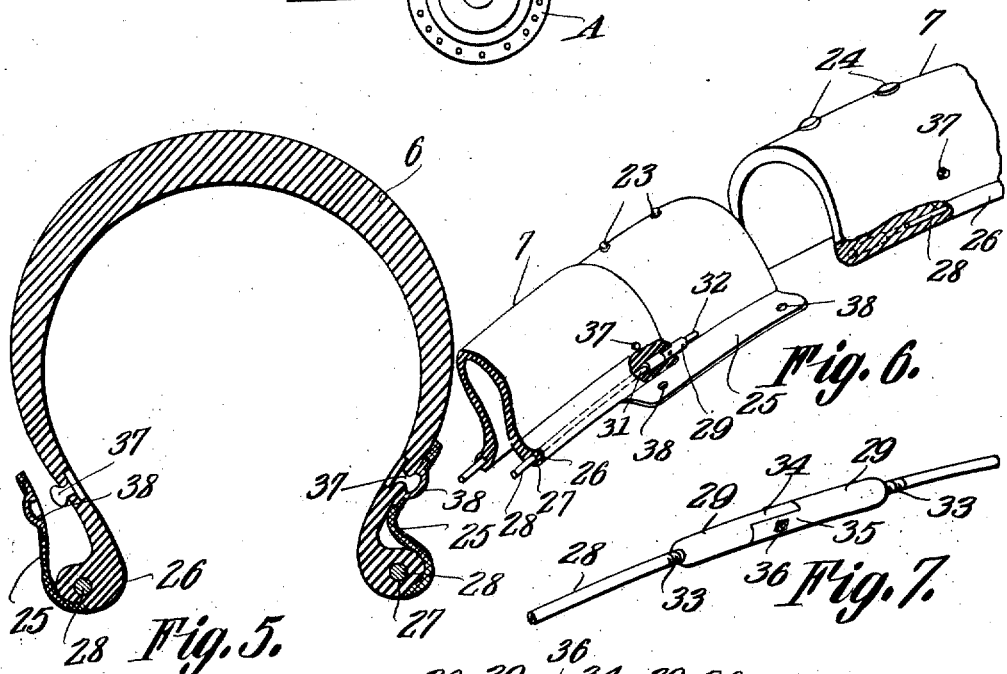

UNITED STATES PATENT OFFICE.

DOMENICO RONCONI, OF BALTIMORE, MARYLAND.

WHEEL-TIRE.

1,008,284.  Specification of Letters Patent.  Patented Nov. 7, 1911.

Application filed February 1, 1911. Serial No. 605,864.

*To all whom it may concern:*

Be it known that I, DOMENICO RONCONI, a subject of the King of Italy, residing at Baltimore city, State of Maryland, have invented certain new and useful Improvements in Wheel-Tires, of which the following is a specification.

My invention relates to an improvement in wheel tires for automobiles and the like, and has for its object to provide a tire for vehicles of this class which may be quickly and easily repaired, and dispenses with the necessity of carrying extra tires for the purpose of replacing those which may be damaged or injured by accident or otherwise, in order that a journey may be continued without the delay incident to the making of immediate repairs to those in use. The further object being to provide a tire of this character which dispenses with the necessity of carrying a number of such extra tires for the purposes as above stated, thereby reducing the weight to be carried by the vehicle, and also reducing the cost incident to the purchase of such extra tires, by the use of tires constructed in accordance with my invention to a minimum, as compared with the cost of purchasing the ordinary tires for such purposes now in use.

With the foregoing objects in view, my invention consists in certain novel features of construction and combinations of parts which will be hereinafter described and pointed out in the claim.

Figure 1:
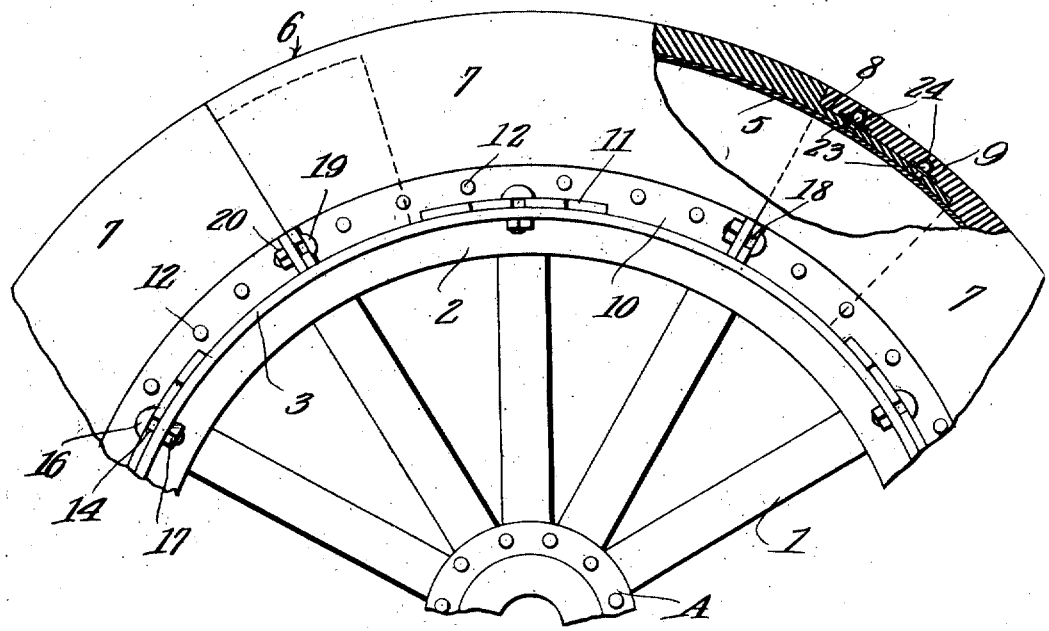
Figure 2:
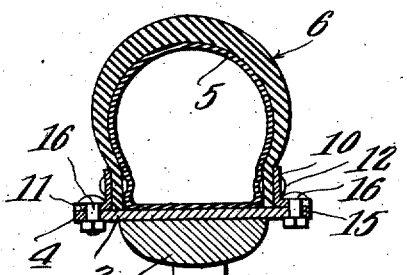
Figure 3:
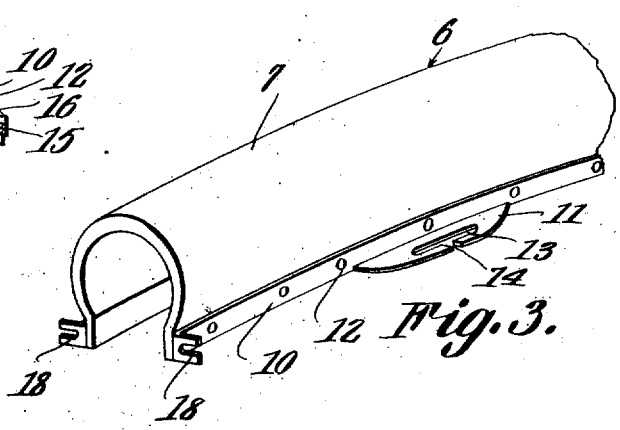

Reference being had to the accompanying drawings, forming a part of this specification, Figure 1 is a side elevation of a portion of a wheel with my tire applied; Fig. 2 is a transverse sectional view of the same; Fig. 3 is a perspective view of the male end of one of the sections; Fig. 4 is a portion of a wheel with a modified form of my tire applied thereto; Fig. 5 is a section through the outer tire; Fig. 6 is a perspective view of the adjacent ends of two tire sections; Fig. 7 is a perspective view of the joined ends of the binding rods, and Fig. 8 is a longitudinal section through the device shown in Fig. 7.

A, indicates the hub of a wheel, 1 the spokes, 2 the felly; 3 the rim, preferably made from metal, and having its side edges extended beyond and overhanging the felly 2 as at 4, 4; 5 the inner tube, made from rubber or a rubber composition, adapted to be filled or blown up with air; 6 the tire or outer casing, made from any suitable material, preferably rubber or rubber composition, the tire 6 being composed of a series of sections 7, overlapping on each of their ends their entire circumference as indicated at 8 and 9 respectively as shown in Fig. 1. Provided on the lower edges of each of these sections is a metal strip 10, provided with a flange 11, secured thereon by any suitable means, such as the rivets indicated 12, the flange 11 of the strip is provided with a longitudinal slot 13, communicating with a transverse opening 14, the flange 4, of the rim 3, being provided with an opening 15, through which is extended a bolt 16, provided with a nut 17, by which means the sections 7 are secured on the rim 3. Each end of the strips 10 is bent outwardly at right angles to the body part, and provided with apertures 18, inserted through which are bolts 19, having nuts 20 provided thereon, by which means the sections 7 are secured together, end to end. The thickness of each of the sections is reduced on the ends as indicated at 21 and 22 respectively, so that when secured together, the combined thicknesses of the sections at these points equals the thickness of a section at its thickest point, and the outer surfaces are flush on the face of the tire; provided on the reduced ends of the sections are male or stud members 23 of a snap fastening button, adapted to be sprung within the eyelet 24 on the inner side of the reduced end of the adjoining section, whereby the overlapping ends of the sections are secured together.

In Fig. 4, is shown a modified form of securing the section on the wheel, and is more especially adapted to wheels of light weight, such as those used on bicycles and other light weight vehicles, and in the construction shown, the rim 3, is dispensed with, the sections composing the tire being provided with a flap 25, instead of the metal strip 10, the sections being thickened on their lower extremities as indicated at 26, in which is longitudinally provided an opening 27, having metal binding rods 28 extended therethrough by which the sections composing the tire are secured on the felly 2; the ends of the binding rods being each provided with a nipple 29, inwardly threaded at 30, into which is secured the ends 31 and 32 respectively of the binding rods 28, which rods are threaded at 33 for the purpose of being screwed thereon; the nipples are reduced on their opposite ends as indicated at 34 and 35 respectively for the purpose of being overlapped, and are secured together by means of the bolts 36.

Provided on the sections near their lower edges is a male or stud member 37, adapted to be sprung into the female or socket member 38 in the flap 25 for the purpose of securing the sections 7 together, end to end, the fastening devices being of the same construction as those previously described and used to secure the overlapping ends of the sections together.

The tire as constructed may be readily taken apart and a new section put in to replace that of another which may have become injured without dispensing with the entire tire, and in the same manner the life of the tire may be prolonged by inserting a new section whenever the occasion may demand, thereby renewing the tire section by section as the sections may become demaged or rendered unfit from any cause whatsoever. The construction of the tire is such that it can be quickly assembled or the parts removed, and renders it only necessary to carry a few of the sectional parts for purposes of repair instead of a complete casing or casings as is customary where the tire or casing is made of a single piece of material thus in the case of an accident or other mishap to the tire the entire tire must be replaced or immediate repair made necessary ofttimes causing prolonged delay.

Slight changes and alterations might be resorted to in the form and arrangement of the several parts described, without departing from the spirit and scope of my invention, and hence I do not wish to limit myself to the exact construction as herein set forth; but, Having fully described my invention, what I claim as new and desire to secure by Letters Patent, is;

A tire of the character described, comprising a plurality of arc-shaped sections having overlapping ends which overlap their entire circumference, means for detachably securing said overlapped ends together above their edges, and means permanently secured to the side edges of each individual arc-shaped section, said means extending along said side edges at the exposed portion only, and adapted to coöperate with the means on the adjacent section together to form a tire.

In testimony whereof I affix my signature in presence of two witnesses.

DOMENICO RONCONI.

Witnesses:
E. WALTON BREWINGTON,
BROWN M. ALLEN.

---

Copies of this patent may be obtained for five cents each, by addressing the "Commissioner of Patents, Washington, D. C."